United States Patent [19]

Howard et al.

[11] Patent Number: 5,052,700
[45] Date of Patent: Oct. 1, 1991

[54] COMPENSATING AND/OR CENTRALIZING GRIP CHUCK

[75] Inventors: Carl J. Howard, Kingsley; Donald J. Wrobel, Sterling Heights, both of Mich.

[73] Assignee: Sheffer Collet Company, Traverse City, Mich.

[21] Appl. No.: 532,897

[22] Filed: Jun. 4, 1990

[51] Int. Cl.⁵ .............................................. B23B 31/12
[52] U.S. Cl. .................................... 279/106; 279/1 L
[58] Field of Search ............... 279/119, 118, 120, 106, 279/107, 1 DA, 1 DC, 1 L, 1 J, 37, 74

[56] References Cited

U.S. PATENT DOCUMENTS

| 164,032 | 6/1875 | Pratt | 279/120 |
| 4,009,888 | 3/1977 | Wallace | 279/119 X |

FOREIGN PATENT DOCUMENTS

| 2060057 | 12/1970 | Fed. Rep. of Germany | 279/74 |
| 65732 | 11/1955 | France | 279/119 |
| 508926 | 1/1955 | Italy | 279/119 |

Primary Examiner—Larry I. Schwartz
Assistant Examiner—Robert Schultz
Attorney, Agent, or Firm—Price, Heneveld, Cooper, DeWitt & Litton

[57] ABSTRACT

A chuck is disclosed which has article gripping member each having a pivot portion intermediate its ends about which the member pivots as the chuck is opened and closed. The members are each caused to pivot by a pin which passes through a slot in the member adjacent the inner end of the member remote from the workpiece gripping outer end thereof. Movement of the pin lengthwise of slot causes the member to pivot. The slot in which the pin is seated is elongated lengthwise of the member and is inclined to the central axis of the member at a very minor angle whereby the centrifugal forces generated by operation of the chuck cannot generate sufficient force to cause the pin to move lengthwise of the seat and thus permit the jaw to release the workpiece.

15 Claims, 4 Drawing Sheets

COMPENSATING AND/OR CENTRALIZING GRIP CHUCK

FIELD OF THE INVENTION

This invention relates to machine tools and particularly to a chuck capable of effectively gripping a product, even if it is irregular irrespective of whether the chuck is functioning as a compensating or as a centralizing chuck. The chuck's construction provides such a reduction in the amount of play or tolerance in the mechanism which holds the chuck closed that the possibility of the chuck inadvertently loosening or releasing its grip on the workpiece is, for all practical purposes, eliminated. The invention provides a very close tolerance means of moving the jaws to clamping position and then holding them in such position.

BACKGROUND OF THE INVENTION

The invention relates to grip compensating and centralizing chucks and more prticularly to such a ball chuck. Ball chucks have been used for many years and in many operations are considered highly preferable because of their ability to provide a strong, positive grip of the workpiece. However, like some other chucks, they are subject to failure or partial failure due to the small but gradual release of their grip on the workpiece. Various techniques have been developed to provide a better lock for preventing a ball chuck from inadvertently releasing or partially releasing its grip on the workpiece. A few of these have been introduced and tried. Some of these attempts to solve the problem have improved the situation but they have not solved it.

The problem is made more complex by the current trend to the use of higher chuck speeds to reduce the cutting time. As chuck speed increases, the centrifugal forces which tend to open the chuck also increase, thus, significantly impairing the reliability of such chucks. Another factor entering into the problems is that of tool pressure. Not only have modern demands required increases in the speed of the chuck, they also have increased the pressure with which the tools are applied, requiring the chuck to maintain an even more positive grip on the workpiece. All of these factors have combined to materially complicate the problem of maintaining a positive grip on the workpiece and of being certain that this grip remains constant and does not loosen during the machining operation.

BRIEF SUMMARY OF THE INVENTION

The invention provides a grip compensating and/or centralizing chuck with a wedging engagement between the actuator arm and the actuator so designed that substantially all tolerance between the two engaging surfaces is eliminated whereby the lock effected between the actuator and the pull exerted by the draw bar is sufficiently positive to hold the chuck closed even against the centrifugal forces of high speed operation. Further, the invention provides contact surfaces for these interengaging parts having enough bearing area that they are not subject to significant wear under normal operating conditions. The invention also makes its possible, by reason of its design, to machine the interengaging surfaces with provide the lock to extremely precise dimensions without materially increasing the complexity of the machining operation. It also makes it possible to adequately and satisfactorily machine the parts with materially reduced scrap factor due to inter- fitting surfaces which are out of tolerance and, thus, unacceptable.

The invention provides such a lock which is automatically self-adjusting because it provides a degree of float of the clamp operating pin. This permits the pin to be self-centering and compensate for even the minute tolerance accumulation which remains between the interengaging parts. With the lack of play and low tolerance accumulation, the conditions which initiate loosening even at high speeds and increased tool pressure are eliminated.

DESCRIPTION OF THE PREFERRED EMBODIMENT

The chuck 10 has a front plate 11 on which are mounted three workpiece engaging jaws 12. The jaws are radially movable to effect engagement of the jaws with a workpiece seated between them and centered with respect to the central axis A of the chuck.

Figure 1:
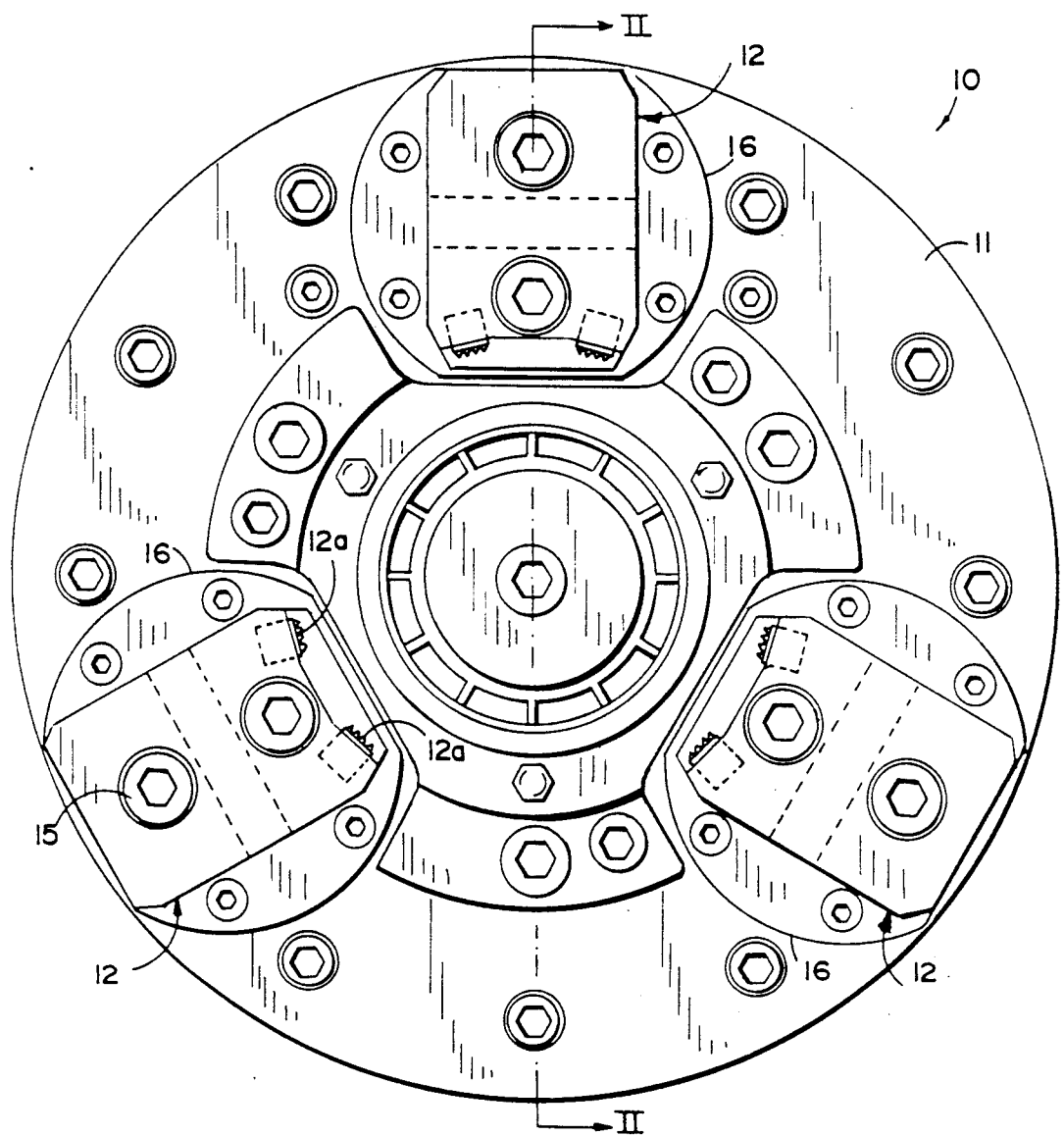
FIG. 1 is a front view of a chuck incorporating this invention.
Figure 2:
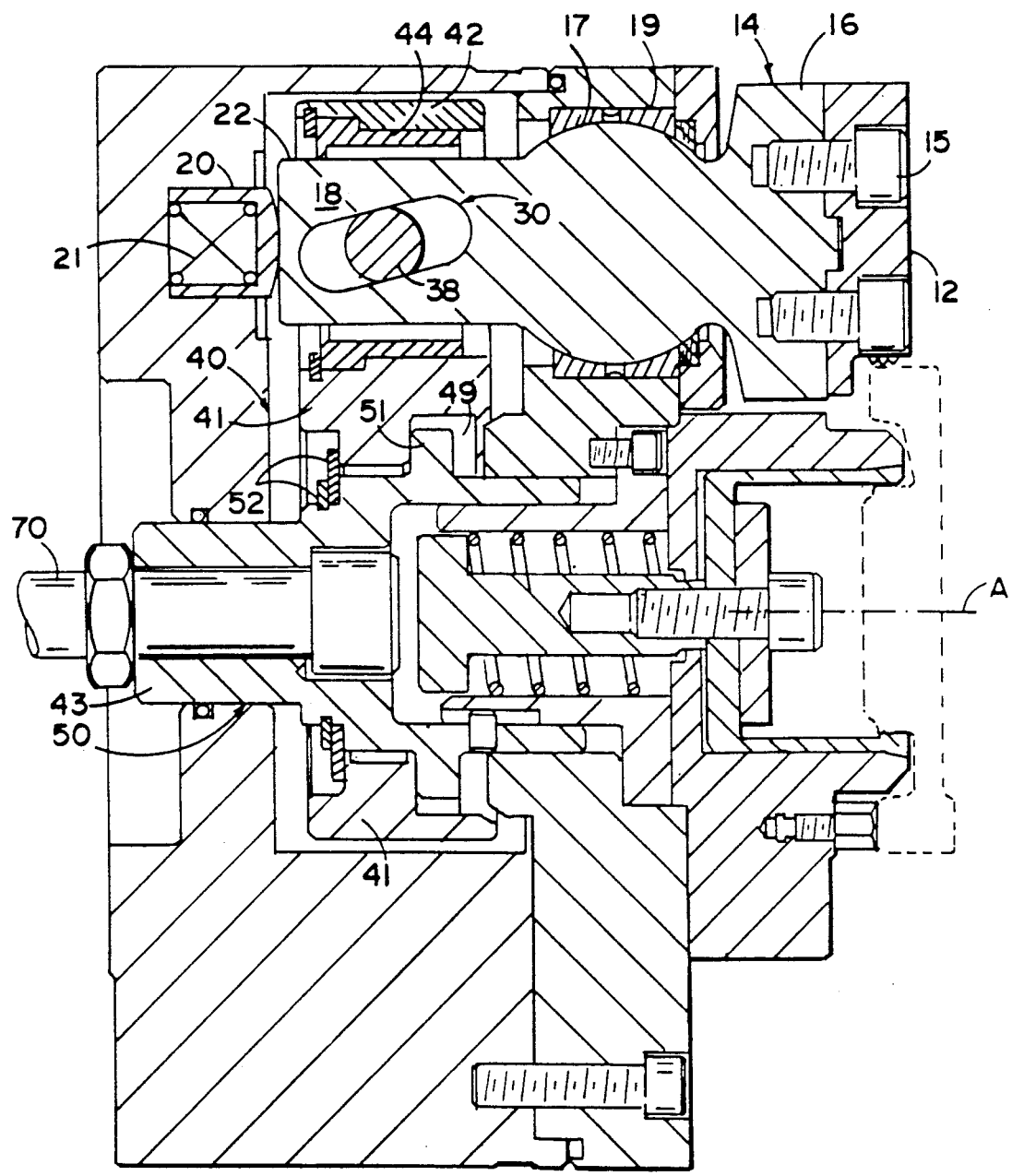
FIG. 2 is a sectional elevation view taken along the plane II—II of FIG. 1.

Referring to FIG. 2, from which cross-sectioning has been omitted for the sake of clarity, each of the jaws 12 is mounted on the outer end of an arm 14 by suitable means, such as the cap screws 15. Each of the arms 14 are identical and has an outer portion 16 to which the jaws 12 are bolted and an intermediate portion 17 and an inner portion or leg 18. Each jaw is equipped with workpiece engaging means 12a. The intermediate portion 17 has a shape which is part of a sphere and is mounted for rocking motion within the bearing 19 so that it is capable of serving as the pivot for radial motion of the arm.

The inner end 22 of the inner portion 18 of the arm extends rearwardly of the chuck and bears against the pressure cap 20 which, by means of its internal spring 21, urges the arm outwardly. The top of the pressure cap is convex to accommodate rocking motion of the arm 14.

Figure 3:
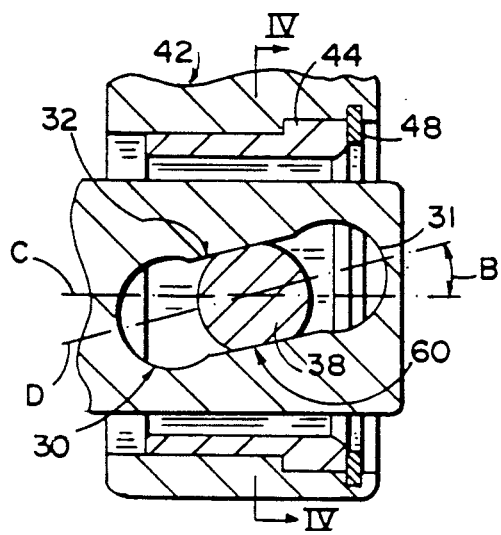
FIG. 3 is an enlarged, fragmentary, sectional view of the inner end of the clamping arm.

Between the intermediate portion 17 and the inner end 22, the arm is provided with a slot 30. This slot, in a direction from the back to the front of the chuck, is inclined radially outwardly at an angle B of 10° with respect to the centerline C of the arm 14 (FIG. 3). The slot 30 is located adjacent the inner end of the arm 14 and all of it is spaced inwardly or rearwardly of the intermediate portion 17.

The end portions 31 of the slot 30 can be formed by bored openings but the central or main portion 32 of the slot between the end portions 31 is straight and has a cross sectional width machined to a tolerance of ±0.0005 inch (FIG. 3). The main portion of the slot is so located that the center longitudinal axis C of the arm 31 intersects the central axis D of the slot 30 midway between the ends of the slot (FIG. 3).

Figure 2A:
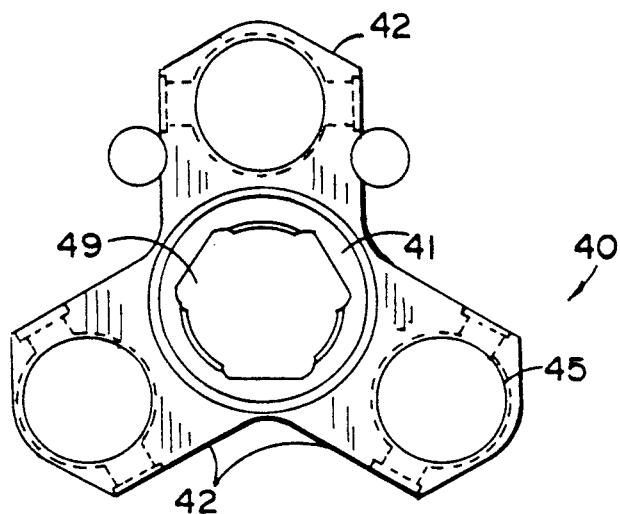
FIG. 2A is a front view of the actuator which transmits motion from the actuator support to the arm.

Seated in and extending transversely of the slot 30 is a pin 38 (FIGS. 2, 3, 6 and 7). The pin 38 projects beyond each end of the slot 30 and on its ends is rotatably secured to the actuator 40 by means (FIG. 4) which are described subsequently. The actuator 40 has a central hub 41 from which three arms 42 radiate (FIG. 2A). Only one of these arms is illustrated in FIG. 2. It will be recognized that if a chuck is built incorporating this invention using more than three workpiece engaging members, the actuator 40 will have additional arms to accommodate such a design. The actuator 40 has a central opening 49 through which passes the actuator support 50. The actuator support 50, as its inner end, has internally threaded means 43 to connect it to the draw bar 70 of a conventional machine tool. The actuator 40 is connected to the actuator support 50 for movement therewith axially of the chuck by a flange 51 and retaining rings 52.

Figure 4:
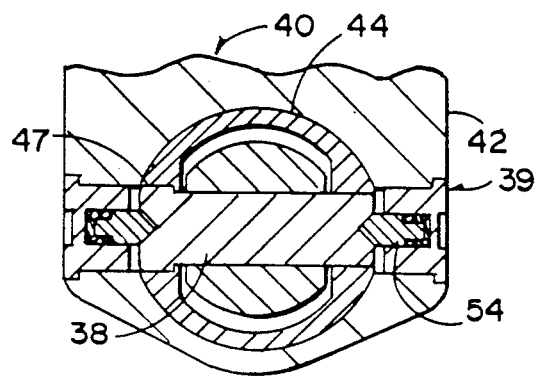
FIG. 4 is an enlarged, fragmentary, sectional view of the pin and arm interconnection taken along the plane IV—IV of FIG. 3.

Each of the arms has a bearing 44 mounted in an opening 45 in its outer end. The bearing 44 and the arm each have aligned openings to seat the pivot pin 38 of the pivot pin assembly 39 (FIG. 4). The pin 38 is seated in the opening 46 and has a shoulder 47 which limits its axial movement. The bearing 44 is locked in place by the snap ring 48 (FIG. 3).

Figure 5:
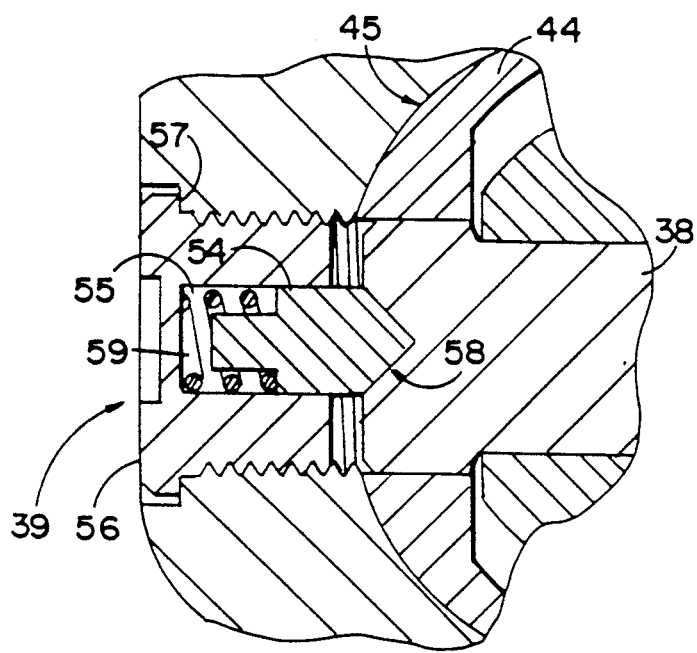
FIG. 5 is a fragmentary, enlarged, sectional view of a typical end support for the pin.

The pin assembly 39 (see FIG. 5) includes a pair of bearing pins 54 one of which is seated in the central recess 55 of each of the end caps 56. The end caps 56 are threaded into openings in the arm 42 at the opposite ends of the bearing pin. Their insertion is limited by a shoulder 57. The bearing pins 54 are pressed into contact with the V-shaped sockets 58 in each end of the bearing pin 38 by springs 59 (FIGS. 4 and 5). It has been found that the combination of the V-shaped sockets and the cone-shaped heads of the bearing pins (FIG. 5) are a preferred construction for properly centering the bearing pins with respect to the openings in the actuator plate.

Figures 8, 9:
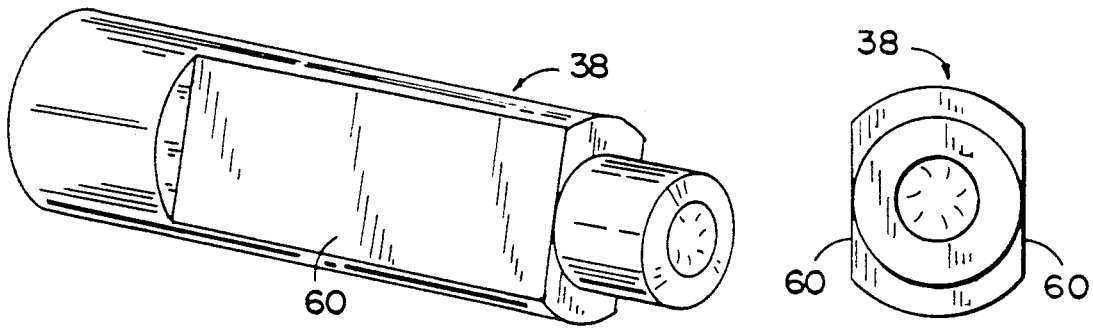
FIG. 8 is an oblique view of one of the pivot pins.
FIG. 9 is an end view of the pin.

The pin 38 has a pair of diametrically located flattened areas 60 which seat against the walls of the slot 30 in the arm 14 (FIGS. 3, 8 and 9). Both the spacing between the flattened areas 60 and the width of the slot 30 are held to close tolerances, a matter of a few ten thousands of an inch, to eliminate, as far as possible, any play or lapse between the pin member 38 and arm 14. This is necessary to assure uniform and effective gripping of the workpice of all of the jaws. Also, this close tolerance fit coupled with the 10° inclination of the axis of the slot 30 to the central axis of the arm provides a construction which does not have any tendency to lose its gripping pressure as the result of the centrifugal forces generated by the rotation of the chuck.

Figure 6:
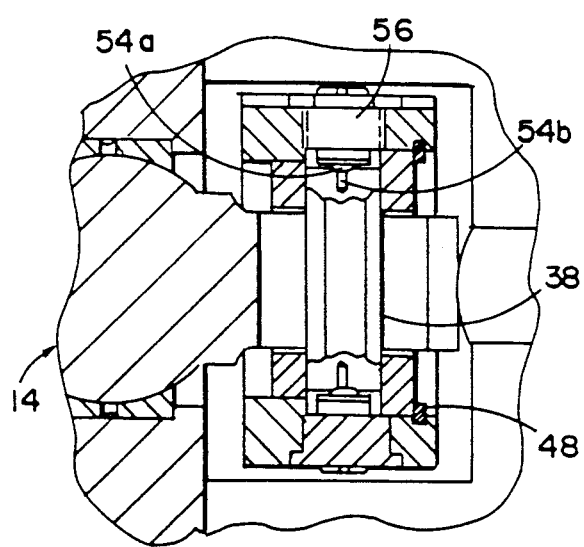
FIG. 6 is a fragmentary, sectional view of a modified construction for the pin support in which only the ends of the pin are sectioned.
Figure 7:
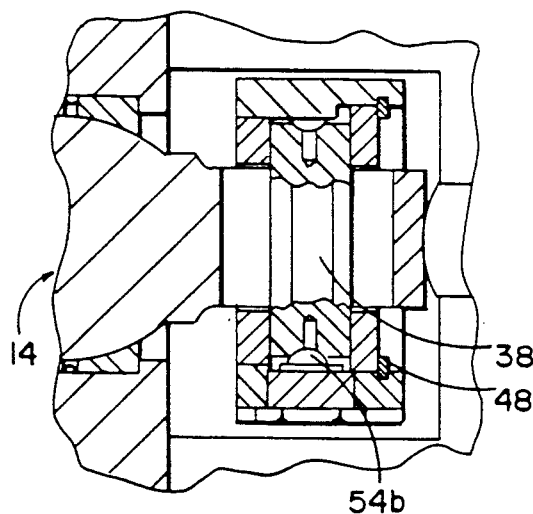
FIG. 7 is a fragmentary, sectional view similar to FIG. 6 of a modified construction for the pin and its support.

FIGS. 6 and 7 illustrate modified designs for mounting the pins 38. In FIG. 6, the rounded ends of the bearings pins 54a seat in shallow, hemispherical depressions to center the pin 38 with respect to the end caps 56. the construction of the end caps remains the same. FIG. 7 illustrates the same construction except the openings in the end of the pin 38 are hemispherical and the bearing pins 54b are conical to seat in, support and positively locate the pin 38. Again, the structure of the end caps assembly remains the same.

The described and illustrated construction is that of a centering chuck wherein the jaws are each able to adjust their individual radial position such that each will clamp the workpiece with equal force. This will result in the workpiece being centered between them. This is termed "centering mode". Thus chuck can be constructed in a manner such that one of the jaws can be locked against radial float with respect to the remaining jaws and the remaining jaws will then clamp the workpiece against the non-floating jaw. This arrangement is useful for certain machining operations. Construction of chucks capable of being adjusted to perform in either mode is well-known and does not constitute part of this invention. However, it is to be understood that chucks incorporating this invention can be designed to operate in either mode.

The construction of the support for the pin 38 is also important in maintaining an effective grip on the workpiece. The combination of the shape of the heads of the bearing pins 54, 54a and 54b and the self-centering shape of the sockets into which they fit coupled with the resilient pressure exerted by the springs 59 are effective in eliminating any play between the actuator plate 40 and the arm 14, assuring the application of positive clamping pressure on the workpiece at all clamping points.

Also of importance to this invention is the fact that the individual jaws can adjust for small irregularities in the external surface of the part to be machined. The external surface against which the engaging means 12a seat may be such that both engaging means 12a of a jaw cannot engage the part with equal pressure. To overcome this and gripping pressure exerted by each engaging means 12a of the jaw, the arm 14 is allowing to rotate slightly to equalize the bearing pressure of the engaging means of the jaw. When this occurs, the bearing pins 54 are caused to retract slightly and thus permit the pin 38 to assume a slightly eccentric position with respect to the actuator 40. When the part is released, the spring 59 automatically restores the pine 54 to its normal operating position. This capability of automatic compensation is important to maintaining a positive and dependable grip on the workpiece. Further, this feature performs this function both when the chuck is in grip compensating or centralizing mode.

The invention provides a chuck suitable for high-speed operation even with increased tool pressure. It is capable of reliably maintaining its grip on the workpiece. It will be recognized that even though a preferred embodiment of the invention has been described that modifications of the invention can be made. Such modifications as incorporate the principles of the invention and are described by the language of the hereinafter appended claims are to be considered as included in said claims.

We claim:

1. In a ball chuck the improvement comprising: a chuck body; a plurality of arms arranged concentrically at equal spacings around the central axis of the chuck; a plurality of socket means each pivotally supporting one of said arms intermediate its inner and outer ends for pivotal movement toward and away from said central axis, each of said arms having an outer portion and an inner portion integrally joined by a central portion; the outer portion of each arm having means for mounting a workpiece engaging and gripping element; an actuator mounted in said chuck body for reciprocal movement along the central axis of said chuck, said actuator having a plurality of openings therein, one for each of said arms, the inner end portion of each of said arms extending through one of said openings and having an elongated slot therein, a pin extending through said slot in engagement with the walls thereof, said pin being secured to said actuator, said slot being inclined to the longitudinal central axis of said arm such that one end of said slot is further radially spaced than the other end thereof from the central axis of said chuck, the walls of said slot which engage said pin during the limits of axial travel of said actuator being parallel and closely and slidably engaging said pin to effect identical distance of radial movement of each of said arms in response to axial movement of said actuator.

2. In a ball chuck the improvement comprising: a chuck body having a plurality of actuator arms arranged concentrically at equal spacings around the central axis thereof; a plurality of clamping arms and socket means, each socket means pivotally supporting one of said arms intermediate its ends for pivotal movement radially of the chuck toward and away from said central axis, each of said arms at one end having a workpiece engaging grip, an actuator mounted in said chuck body for axial movement along the central axis of said chuck body; means interconnecting the other end of each of said arms to said actuator, said means being a slot in and adjacent said other end of each arm, and a pin mounted on said actuator and extending through said slot, each slot having parallel side walls and being inclined radially with respect to the central axis of said chuck whereby axial movement of said actuator will shift each of said pins lengthwise of its slot and pivot the arms radially, each pin having a pair of diametrically located parallel flattened faces adapted to slidably and closely seat between and against said side walls of the slot through which it passes for transmitting axial movement of the pin to the arm.

3. The improvement in a ball chuck described in claim 2 wherein said slot is inclined at a minor angle in a radially inward-outward direction with respect to said central axis.

4. The improvement in a ball chuck described in claim 3 wherein said minor angle of radial inclination of said slot to said central axis of the chuck is 10°.

5. The improvement in a ball chuck described in claim 2 wherein each of said pins has a conical recess at each end centered on the pin's longitudinal axis; a bushing mounted in said actuator at each end of each of said pins and a pivot member having an end shaped to seat in one of said recesses at each of the pin recesses, each of said pins being slidably received in its supporting bushing; resilient means pressing each pivot member against the pin.

6. In a ball chuck the improvement comprising: a chuck body having a central axis, a plurality of arms arranged at equal radial spacings from said central axis, each of said arms having an outer portion for engaging and gripping a workpiece and an inner portion, said chuck body having means supporting each of said arms intermediate its ends for radial pivotal movement between workpiece gripping and releasing positions, an actuator mounted in said chuck body for movement parallel to the central axis of said chuck body, each of said arms adjacent its inner end having an elongated slot at least the central portion of which has parallel sides, said slot extending lengthwise of the arm and being inclined at a minor angle to the longitudinal centerline of the arm and radially to the central axis of the chuck body, said actuator having an opening for each of said arms, the inner end of each of said arms extending through one of said openings and a pin anchored to said actuator extending through said slot whereby engagement of said pins with said slots will pivot said arms radially in response to movement of said actuator lengthwise of said central axis to pivot said arms between article clamping and releasing positions.

7. The improvement in a ball chuck as described in claim 6 wherein each of said pins has a pair of parallel spaced flat surfaces, extending lengthwise of the pin for seating against the parallel sides of the slot through which it passes.

8. The improvement in a ball chuck as described in claim 7 wherein means are provided at each end of each pin for securing it to said actuator for rotation about its longitudinal axis.

9. The improvement in a ball chucks as described in claim 8 wherein spring means are provided at each end of each of said pins to center the pin lengthwise between its supports.

10. The improvement in a ball chuck as described in claim 9 wherein each workpiece engaging grip has a pair of circumferentially spaced workpiece engaging surfaces, said spring means being retractable to permit the arm to rotate about its central axis with respect to said actuator sufficiently to effect equal bearing against the workpiece by both of its workpiece engaging surfaces.

11. The improvement in a ball chuck as described in claim 10 wherein the arms of the chuck are capable of rotation with respect to the actuator when the chuck is being used in either centralizing or compensating mode.

12. The improvement in a ball chuck as described in claim 7 wherein the longitudinal centerline of each of said arms intersects the longitudinal axis of the slot substantially midway between the ends of the slot.

13. The improvement in a ball chuck as described in claim 8 wherein the angle at which the centerline of said slot is inclined to the centerline of said arm is approximately 10°.

14. The improvement in a ball chuck as described in claim 8 wherein the centerline of said slot is inclined to the centerline of said arm with that end of the slot adjacent the workpiece grip being spaced further from the centerline of the chuck than the other end of said slot.

15. The improvement in a ball chuck as described in claim 14 wherein the inclination of said slot from the axial centerline of the chuck is approximately 10°.

* * * * *